(12) United States Patent
Wakeland

(10) Patent No.: US 7,457,484 B2
(45) Date of Patent: Nov. 25, 2008

(54) METHOD AND DEVICE TO PROCESS DIGITAL MEDIA STREAMS

(75) Inventor: Carl K. Wakeland, Scotts Valley, CA (US)

(73) Assignee: Creative Technology Ltd, Singapore (SG)

( * ) Notice: Subject to any disclaimer, the term of this patent is extended or adjusted under 35 U.S.C. 154(b) by 893 days.

(21) Appl. No.: 10/875,259

(22) Filed: Jun. 23, 2004

(65) Prior Publication Data
US 2006/0008180 A1   Jan. 12, 2006

(51) Int. Cl.
G06K 9/60 (2006.01)
G10L 21/04 (2006.01)

(52) U.S. Cl. .................................. 382/303; 704/500
(58) Field of Classification Search .................. 382/145, 382/303–305, 307; 704/205, 211, 500; 712/35; 709/231, 232
See application file for complete search history.

(56) References Cited

U.S. PATENT DOCUMENTS

| | | | |
|---|---|---|---|
| 4,191,919 A * | 3/1980 | Haney et al. ................. | 324/312 |
| 5,054,360 A | 10/1991 | Lisle et al. | |
| 5,572,691 A | 11/1996 | Koudmani | |
| 5,883,804 A | 3/1999 | Christensen | |
| 6,012,142 A | 1/2000 | Dokic et al. | |
| 6,081,783 A | 6/2000 | Divine et al. | |
| 6,492,903 B1 | 12/2002 | Ranon | |
| 6,570,912 B1 | 5/2003 | Mirfakhraei | |
| 6,751,641 B1 | 6/2004 | Swanson | |
| 6,804,655 B2 * | 10/2004 | Dokic et al. ................. | 704/500 |
| 6,885,992 B2 * | 4/2005 | Mesarovic et al. .......... | 704/500 |
| 6,892,339 B1 * | 5/2005 | Polk et al. ................... | 714/746 |
| 6,937,988 B1 * | 8/2005 | Hemkumar et al. ......... | 704/500 |
| 7,254,766 B2 * | 8/2007 | Polk et al. ................... | 714/748 |
| 2003/0229490 A1 | 12/2003 | Etter | |

FOREIGN PATENT DOCUMENTS

WO   WO-2006002209 A2   1/2006
WO   WO-2006002209 A3   1/2006

OTHER PUBLICATIONS

"International Search Report, Application No. PCT/US05/22014". (Oct. 31, 2006).

(Continued)

*Primary Examiner*—Kanji Patel
(74) *Attorney, Agent, or Firm*—Schwegman, Lundberg & Woessner, P.A.

(57) ABSTRACT

A method and digital processor to process digital samples is provided. The processor may comprise a time domain processing engine to process a digital sample in the time domain, and a frequency domain processing engine to process a digital sample in the frequency domain. Shared memory is provided in the digital processor with which time domain and frequency domain processed samples are exchangeable. The time domain processing engine may processes data samples in a sample-by-sample manner and the frequency domain processing engine may processes data samples in a block-based manner. The processing engines may be integrated in a single DSP chip. In one embodiment, an interrupt generator is provided that generates an interrupt and an input buffer communicates an input data sample to the processor in response to the interrupt and the output buffer communicates an output data sample to the digital sample bus in response to the interrupt.

46 Claims, 10 Drawing Sheets

OTHER PUBLICATIONS

Moorer, James A., "The Digital Audio Processing Station: A New Concept in Audio Postproduction", *78th Convention of Audio Engineering Society,* Anaheim, CA,(May 1985).

Smith, Julius O., "Unit Generator Implementation on the Next DSP Chip", *Proceedings of the International Computer Music Conference, 1989,* (1989),303-306.

\* cited by examiner

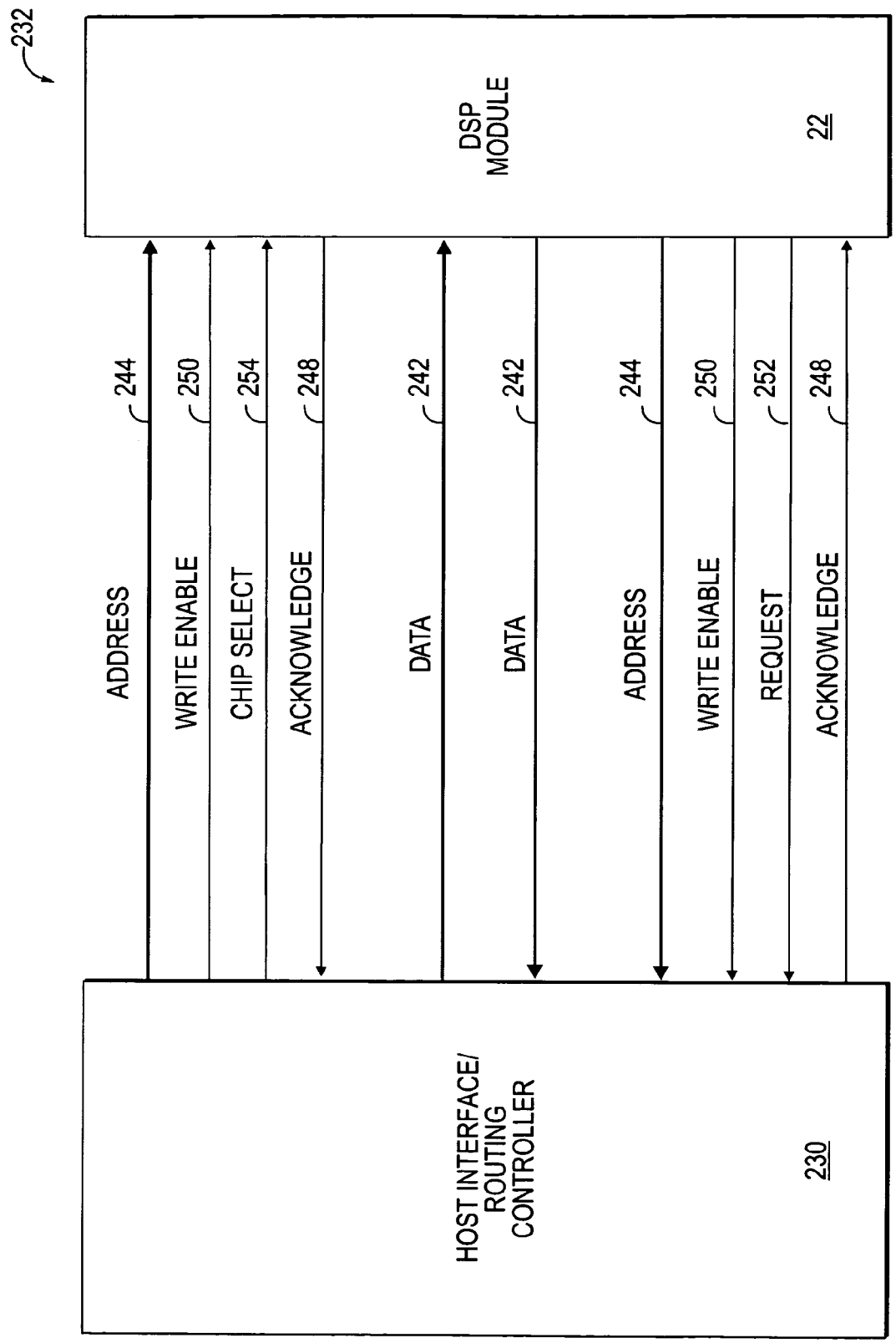

METHOD AND DEVICE TO PROCESS DIGITAL MEDIA STREAMS

FIELD OF THE INVENTION

The present invention relates generally to the field of processing digital media data. More specifically, in one embodiment, the invention relates to a method and system to processing digital data in the time and frequency domains.

BACKGROUND OF THE INVENTION

In processing of digital media streams (e.g., digital audio streams), it is found that there is a demand for two types of algorithms: 1) Block-Based (BB) algorithms, where blocks of audio data are accumulated and then processed as a unit, and 2) Sample-by-Sample (SS) algorithms, which process audio data a sample at a time. Frequency domain or BB algorithms have the advantage of greater computational flexibility, e.g., longer Finite Impulse Response or FIR filters may be realizable, and Fast Fourier Transform or FFT based algorithms are enabled, with a trade-off that blocks of data must be accumulated before processing can begin, thus adding latency. SS processing affords the advantages of very low latency and overhead, and substantially instantaneous response to changes in parameters, which can be very beneficial in applications such as, for example, changing the parameters to a graphic equalizer. The low overhead of SS processing greatly simplifies the dynamic loading and unloading of different SS software algorithms in an audio system, which enables quick modification to the effects processing of an audio stream in response to real-time input.

Prior art Digital Signal Processing or DSP systems are designed to exclusively perform either as BB or SS processors, but not both simultaneously. Accordingly, the standard prior art approach has been to either process the SS and BB algorithms in separate engines, or to convert the SS algorithms to BB algorithms and tolerate a latency and overhead penalty to the performance of the SS algorithms.

SUMMARY OF THE INVENTION

In accordance with the invention, there is provided a digital processing device and method to process media data (e.g., digital audio, video, or the like).

The invention extends to a machine-readable medium embodying a sequence of instructions that, when executed by a machine, cause the machine to carry out any of the methods described herein.

Other features of the present invention will be apparent from the accompanying drawings and from the detailed description that follows.

BRIEF DESCRIPTION OF THE DRAWINGS

The invention is now described, by way of example, with reference to the accompanying diagrammatic drawings. In the drawings.

FIG. 11 shows a schematic block diagram of exemplary interconnectivity between the exemplary host interface between and the DSP of FIGS. 5 and 6.

DETAILED DESCRIPTION

A method and device to process digital media data, is described. In the following description, for purposes of explanation, numerous specific details are set forth in order to provide a thorough understanding of the present invention. It will be evident, however, to one skilled in the art that the present invention may be practiced without these specific details. Further, although the invention is described by way of example with reference to processing audio data, it should be noted that the invention may be used to process any digital data (including video data).

Figure 1:
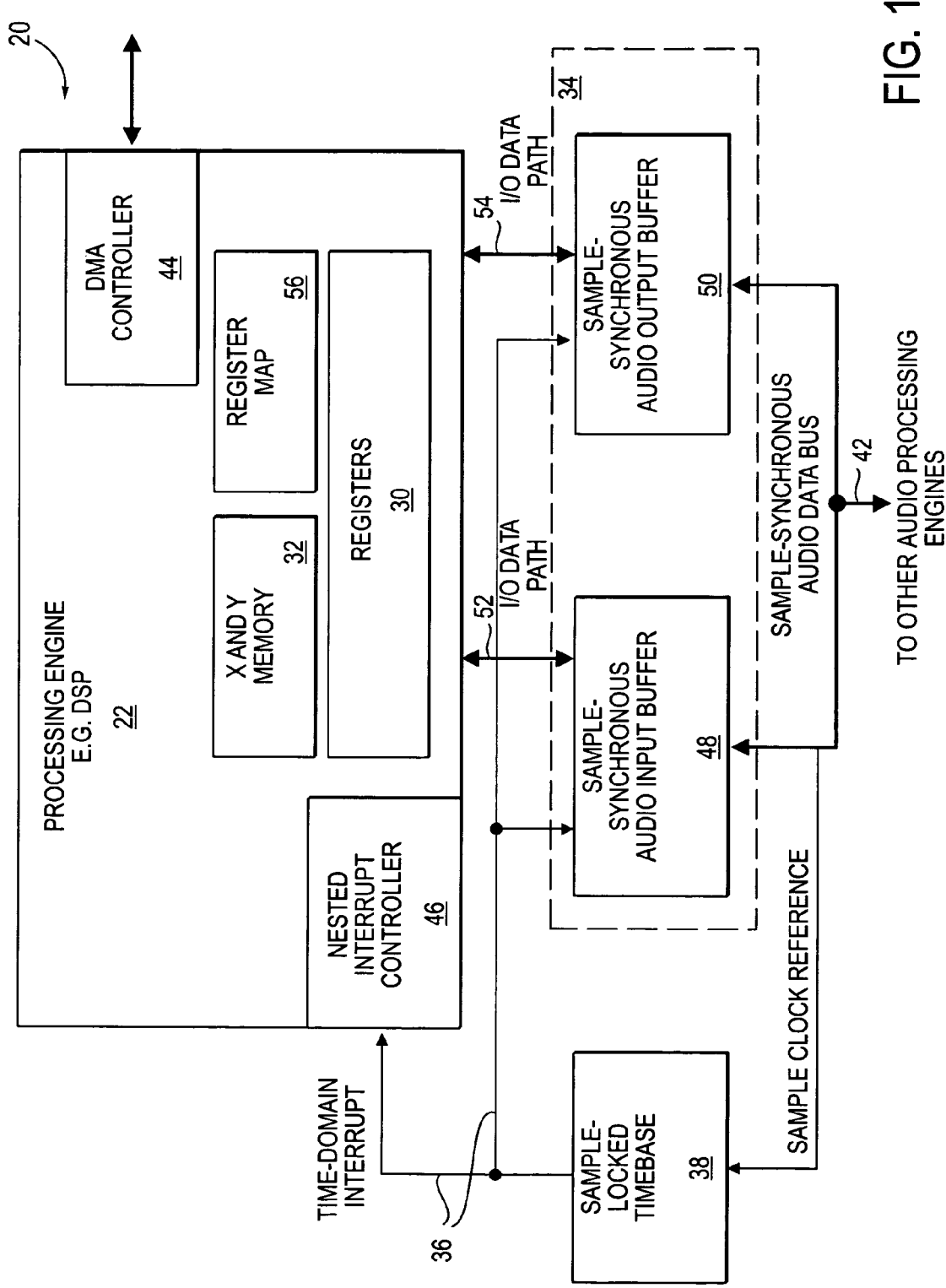
FIG. 1 shows a schematic block diagram of an exemplary digital processor module, in accordance with one embodiment of the invention, for processing data in both time domain and frequency domains in a single device.
Figure 2:
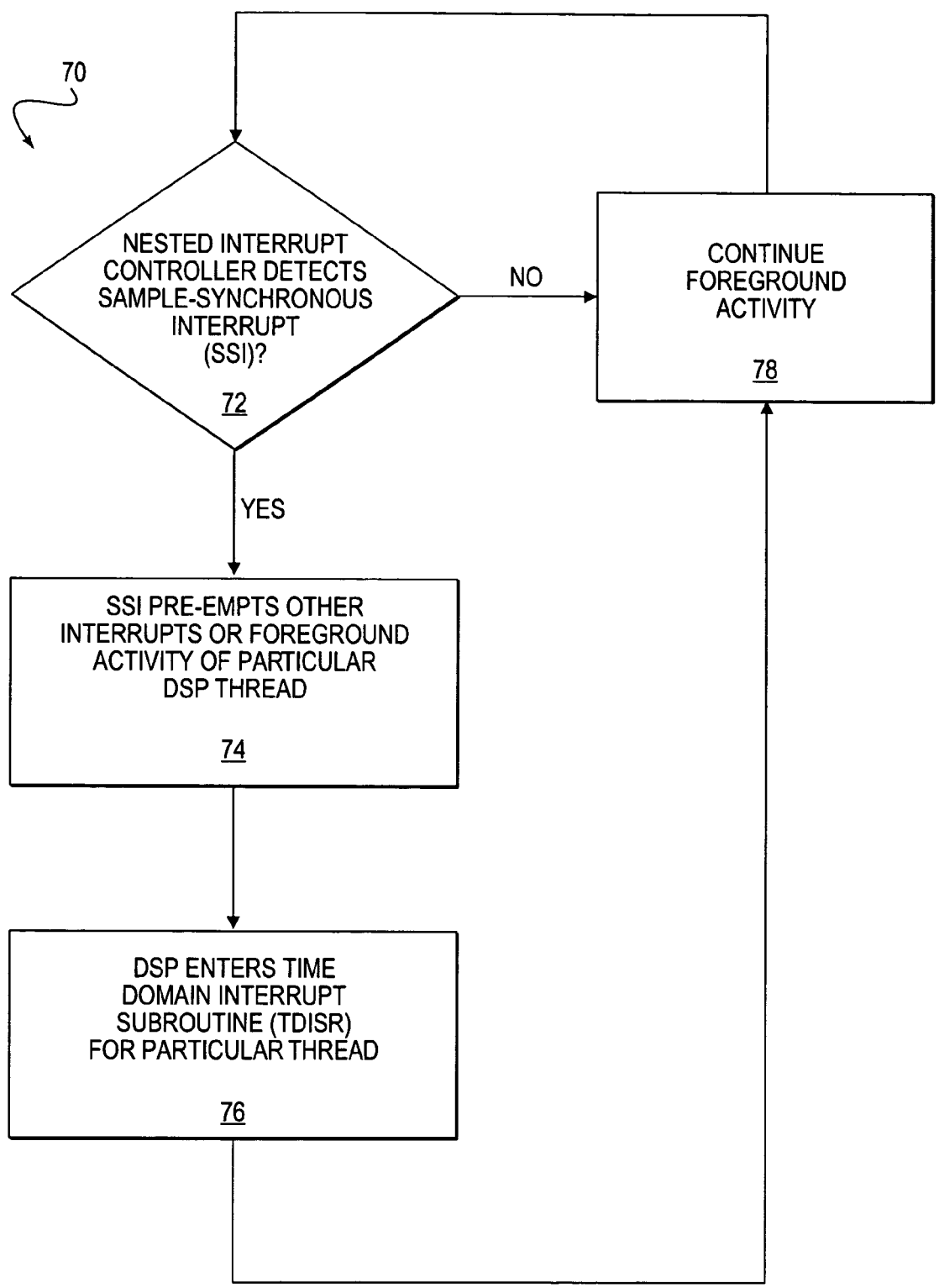
FIG. 2 shows a schematic flow diagram of an exemplary method, in accordance with the invention, for processing time domain or sample-by-sample data.
Figure 5:
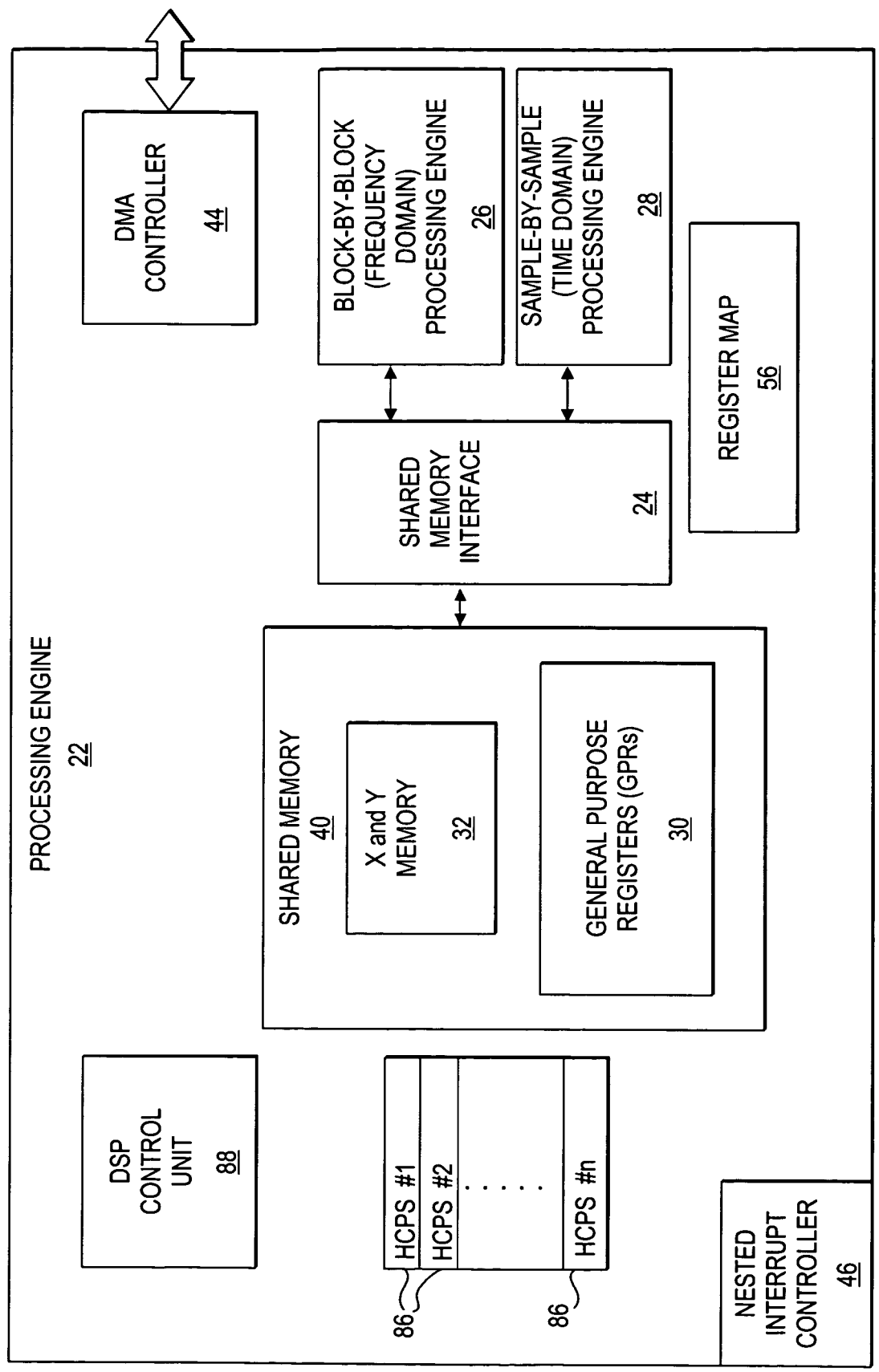
FIG. 5 shows a schematic block diagram of an exemplary DSP, also in accordance with the invention.

Referring to FIG. 1, reference numeral 20 generally indicates architecture of a digital signal processor (DSP) module that, in one embodiment, presents a unified programming environment for processing Sample-By-Sample (SS) or time domain processing algorithms, and Block-Based (BB) or frequency domain algorithms in the same processing engine. The processing engine may be a DSP 22 including a shared-memory interface 24 (see FIG. 5) for passing data between SS and BB domains. For example, data may be passed between a BB or frequency domain processing engine 26 and a SS or time domain processing engine 28. Thus, different effects processed by the DSP 22 can be linked or passed between different processing or effect engines. In the processing engine 22 shown in FIG. 1, various standard components included in such an engine have been omitted for the sake of clarity. A person skilled in the art will readily identify the standard components that have been omitted. In one embodiment, the DSP module 20 defines or forms part of an audio processing device e.g., a sound card or the like. Thus, the DSP module 20 may be part of a Personal Computer, MP3 player, portable digital media player, Personal Digital Assistant (PDA), cellular telephone, or any other apparatus or device for processing digital media such as audio and/or video.

The exemplary architecture of the DSP 22 may combine a standard DSP programming model having local general purpose registers (GPRs) 30 and X and Y memory 32. In one embodiment, parallel address generation is provided together with a sample-by-sample programming model having a very large register space (e.g., the general purpose registers 30) and buffers (e.g., sample rate locked ping-pong buffers 34—see FIG. 1) for the passing of data between other audio processing engines (which may be sample-locked). The BB and SS environments may be linked together by an interrupt (e.g., a low-latency sample-rate locked interrupt 36) that synchronizes the switching of the exemplary sample rate locked ping-pong buffers 34. In one embodiment, the sample-rate locked interrupt 36 is generated by a sample-locked timebase module 38. In one embodiment, the DSP 22, the sample-locked timebase module 38, and the buffers 34 all integrated on a single VLSI chip or circuit. The sample-locked timebase module 38 and the buffers 34 may thus be integrated within circuitry of the DSP 22 as such.

In one exemplary embodiment, simultaneous, dynamic allocation of multiple software DSP effects (e.g., reverberation, echo, chorusing, graphic equalization, spatialization, or the like) is provided in a shared memory environment 40 (see FIG. 5) employing thread-interleaved processor architecture for the DSP 22. For example, each DSP thread may possess a unique or dedicated large register set for SS processing, but can communicate either through the shared memory 40 (which may be useful when passing blocks of data for BB processing) or through sample-rate locked ping-pong buffers 34 that may be mapped into the I/O spaces of the particular thread. Thus each DSP thread may capable of sending and receiving sample-rate locked data either to/from one thread to another thread or to/from external sample-rate locked processing engines outside the DSP 22 e.g., via an audio bus 42 or a DMA interface or controller 44. Each individual interleaved thread may be interrupted by the same low-latency sample-rate locked interrupt source (e.g., the interrupt 36) for synchronous SS processing. The shared memory environment 40 may be integrated within the DSP 22 and be mapped into the DSP's I/O space.

In one embodiment, the ping-pong buffers 34 are double-buffered on their inputs and outputs. A sample-rate locked multiplexer or mux may control the ping-pong buffers 34 located between the audio bus 42 and the DSP 22, so that only one of the DSP 22 and the audio bus 42 has access to a given buffer in a given sample period. Accordingly, in one embodiment, simultaneous access to a given buffer by both the DSP 22 and the audio bus 42 is not permissible. In the ping-pong buffers 34, while one buffer is receiving or sending a new transmission of digital data, the other buffer holds a previous transmission of data that is being operated on.

The exemplary DSP module 22 of FIG. 1 may be a thread-interleaved DSP that includes a nested interrupt controller 46 that receives the sample-rate locked interrupt 36 (sample-locked interrupt notifications) from the sample-locked timebase module 38, which in turn is synchronized (e.g., via a sample clock reference) to the sample rate of the exemplary sample-synchronous audio bus 42. The DSP 22 is also coupled to the sample-rate locked ping-pong buffers 34 and, in particular, to its sample-synchronous input buffer 48 and to its sample-synchronous output buffer 50. The input and output buffers 48, 50 are ping-pong buffers that switch synchronously with the aforementioned sample-locked interrupt 36. One side of each ping-pong buffer 48, 50 is visible to the DSP 22 through I/O Data Path(s) 52, 54 which may be read and written through an I/O register map 56 of the DSP 22. The other side of each ping-pong buffer 48, 50 is visible to the sample-synchronous audio data bus 42, through which sample-synchronous data can be passed between the DSP and other audio processing blocks or modules (e.g., in a VLSI chip).

In one embodiment, the nested interrupt controller 46 allows sample-locked interrupts to pre-empt any other interrupts or foreground activity of a DSP thread and cause the DSP 22 to enter a Time-Domain Interrupt Subroutine (TDISR) during which SS processing is performed. The pre-emption characteristic of the interrupt controller 46 for this Time-Domain Interrupt Subroutine may provide guaranteed maximum interrupt latency to each DSP thread. For example, a 4-thread pipeline-interleaved DSP architecture, which provides very low pipeline latency to each thread, may ensure that this maximum latency is quite low and predictable, typically requiring 3-4 thread instruction cycles.

Reference numeral 70 generally indicates an exemplary method, in accordance with the invention, for processing time domain or sample-by-sample data. The method 70 may be performed as a background routine that is executed in response to an interrupt to a foreground routine. As shown at decision operation 72, the method 70 monitors when an interrupt (e.g., the sample-locked interrupt 36) occurs and, if so, the method 70 proceeds to operation 74. The interrupt 36 may preempt all other DSP interrupts and foreground activity of any DSP thread (see operation 74). Thereafter, the method 70 causes the DSP to enter the Time-Domain Interrupt Subroutine for the particular thread as shown at operation 76.

The functionality executed in the Time-Domain Interrupt Subroutine may differ from effect to effect and each DSP 22 may include a plurality of different subroutines each one of which is dedicated to a different effect. For example, a Time-Domain Interrupt Subroutine may be provided for echo, a different Time-Domain Interrupt Subroutine may be provided for reverberation, and so on. Each effect may have dedicated general purpose registers (see general purpose registers 30) for processing the effect. Returning to decision operation 72, in the absence of an interrupt 36, the method 70 may continue with other foreground activity as shown in operation 78.

Figure 3:
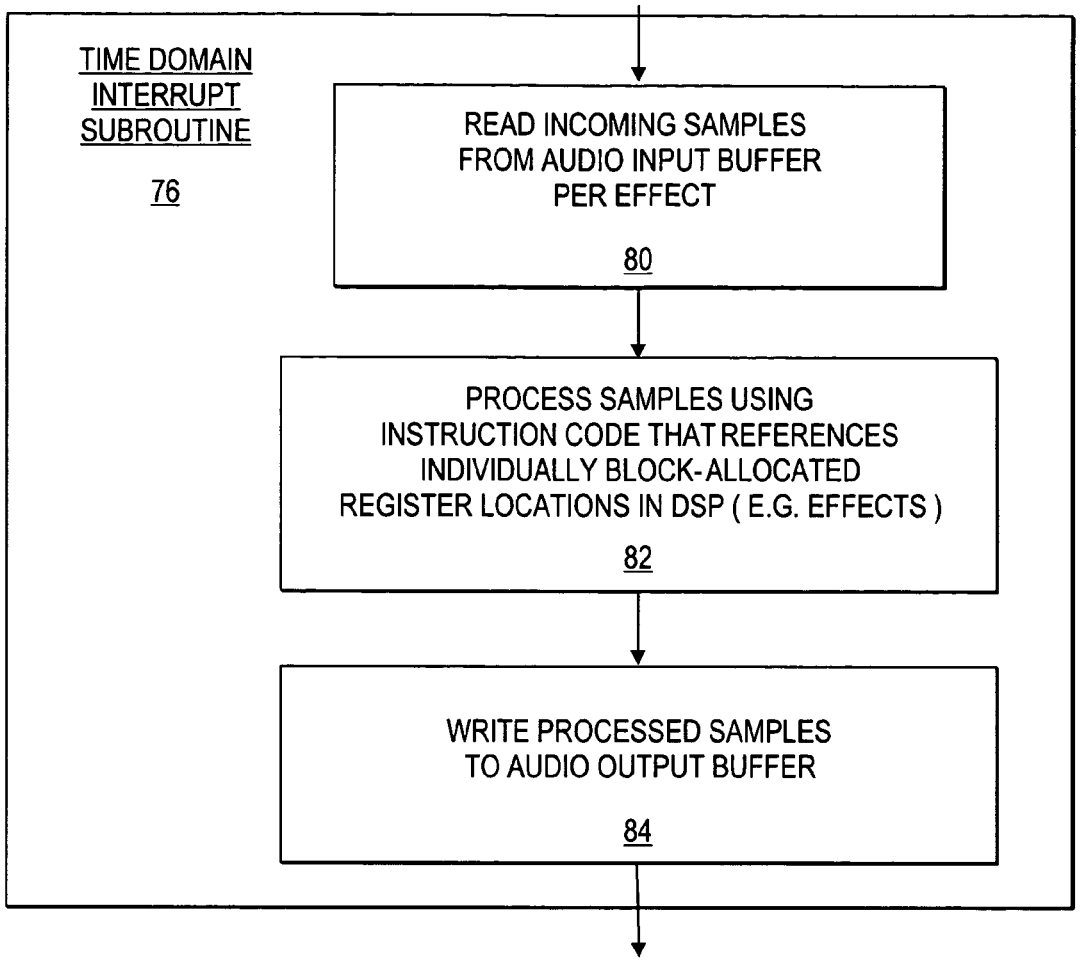
FIG. 3 shows a schematic flow diagram of an exemplary Time Domain Interrupt Subroutine (TDISR), also in accordance with the invention.

Exemplary functionality of a Time-Domain Interrupt Subroutine is shown in FIG. 3. As shown in operation 80, upon receiving an interrupt notification, incoming samples may be read from input buffer 48. One incoming sample may be read for each audio stream being processed. In one embodiment, the sample data in the audio buffer 48 is arranged per effect and, accordingly, the sample data may be read from the input buffer 48 per effect. Thereafter, the sample data is processed using instruction code that references individually block-allocated register locations in the DSP 22 (see operation 82). The block-allocated register locations may require no save and restore overhead. In one embodiment, a very large (typically 1000+) register space in the DSP 22 may make this dedicated allocation of registers possible. As mentioned above, the block-allocated register locations may be arranged per effect. Once the data sample has been processed, the processed sample is then written to the audio output buffer 50 as shown at operation 84. It will be appreciated that a data sample for sample-by-sample processing may also be received from and written to the DMA controller 44. The DMA controller 44 may interface the DSP module 20 to host memory in a personal computer or the like. It is however to be appreciated that the inclusion of the DMA controller 44 in the DSP module 20 is optional and that data samples may be sourced only from the audio bus 42.

In one embodiment, the Time-Domain Interrupt Subroutine is an interrupt service routine that is called once per sample period and is designed to process one audio sample for each audio channel per interrupt. For example, the sample rate may be 48K Hz although it will be appreciated that other sample rates are possible and, accordingly, the Time-Domain Interrupt Subroutine may thus be executed 48000 times per second. In one embodiment, to allow a guaranteed minimum number of DSP thread instructions to execute per sample period, the Time-Domain Interrupt Subroutine, in addition to the aforementioned guaranteed maximum interrupt latency, has the additional quality that it is the highest priority interrupt and cannot be preempted by any other interrupt. In one embodiment, the interrupt 36 is generated upon receipt of a sample for each audio or data channel provided on the data bus 42. Accordingly, the entry of data samples into the DSP 22 may be synchronized with the communication or transport of data samples on the audio bus 42.

While the Time-Domain Interrupt Subroutines (e.g., one for each effect) are executing in the background for one or more of the DSP threads, foreground program code can be dedicated to less latency-critical block-based algorithms (frequency domain processing). The block-based code may use standard DSP constructs such as looping, calls, and jumps, and may also respond to additional interrupts that are lower in priority than the Time-Domain Interrupt Subroutine.

The highest priority status of the Time-Domain Interrupt Subroutine may have certain subtle consequences in the architecture of the exemplary DSP 22. The DSP 22 in one embodiment includes dedicated hardware program counter stacks (HCPS) 86 (see FIG. 5), which may be allocated individually for each thread. For cost reasons, in certain embodiments these exemplary hardware stacks 86 cannot be sized as large as may be necessary for a given program. Therefore, it is possible for a hardware stack 86 to become full. A stack near-full instruction trap may be provided in each thread to detect when a hardware stack 86 is nearly full and, if so, a service routine may be invoked that partially empties the particular hardware stack 86 into a memory buffer so that the particular hardware stack 86 may be further utilized. This may allow a program counter stack 86 to be extended to whatever size the memory buffer allows. In one embodiment, only the Time-Domain Interrupt Subroutines may be allowed to interrupt a stack near-full instruction trap to enhance a low, predictable latency of the Time-Domain Interrupt Subroutine. As a corollary to this, in one embodiment, there may be no stack near-full trap provided to the Time-Domain Interrupt Subroutine, and the Time-Domain Interrupt Subroutine may not use more than a fixed number of hardware stack locations, which must be smaller than the number of remaining hardware stack locations available when the stack near-full trap is asserted. In one embodiment, the nature of the Time-Domain Interrupt Subroutine code, which may emphasize instantaneous switching between dedicated register sets each processing one sample at a time, may be consistent with not requiring program counter stack space. The stack level that may trigger a stack near-full trap may be made adjustable by software (e.g., a software instruction) to allow the number of stack locations available to the Time-Domain Interrupt Subroutine to vary in different embodiments.

It will be appreciated that alternate methods may be used for dealing with large stack requirements. One exemplary method is to make the hardware stacks 86 larger and to not support stack extension beyond the size of the hardware stack 86. However, in this exemplary embodiment, there may be additional hardware costs and the hardware stack may be too small for some software environments. In another exemplary embodiment, a stack near-full interrupt may not be used and an exemplary DSP control unit 88 may write program stack values directly to memory, and read them directly from memory, whenever a hardware stack 86 becomes full. However, this may result in reduced CPU performance when a stack level is high, and additional unpredictable latency may be added to the Time-Domain Interrupt Subroutine.

As mentioned above, the sample-synchronous audio buffers 48, 50 may be two-way ping-pong buffers, and may switch in synchronization with the same clock that is used to generate the Time-Domain Interrupt 36. In one embodiment, the buffers 48, 50 are implemented as Random Access Memories (RAM), where a high order address bit may select between "ping" and "pong" functionality. As described above, the DSP 22 and the sample-synchronous audio sample bus 42 may always access opposite sides of the buffers 48, 50. Accordingly, when the DSP 22 is accessing an upper half of the RAM address space, the sample-synchronous audio sample bus 42 will be accessing the lower half of the RAM address space. On successive sample periods, the DSP 22 and the sample-synchronous audio sample bus 42 exchange address spaces, creating the ping and pong behavior. The synchronization of the Time-Domain Interrupt Subroutine with the switching of the ping-pong buffer 48 enables the DSP 22 to access incoming samples at any time in the sample period (which is the upper limit for the length of the Time-Domain Interrupt Subroutine), without regard to the position of the instruction within the Time-Domain Interrupt Subroutine that is accessing the buffer 48. Similarly, the DSP 22 may write to the output buffer 50 at any time within the Time-Domain Interrupt Subroutine. In a DSP system using a multi-thread interleaved DSP, the sample-synchronous buffers 48, 50 may have global visibility to all threads.

The sample-synchronous audio bus input and output buffers 48, 50 in one exemplary embodiment may have a large number of locations, e.g., 256 or 512 locations, each of which may correspond to an audio stream. The audio bus may comprise a plurality of audio channels and any sample-synchronous audio bus input or output channel that is not being use to receive or transmit audio data samples, and is not being updated by the sample-synchronous audio data bus, may be available for use as a sample-locked inter-thread data channel visible to all DSP threads. This configuration may provide a mechanism (e.g., a primary mechanism) for passing data between Time-Domain Interrupt Subroutines operating in different DSP threads. When an unused output buffer channel is used for inter-thread data passing, the passed data may still appear as valid data on the sample-synchronous audio bus in a DSP sample-synchronous audio bus slot allocated for that output buffer channel. It will be appreciated that data samples that are output to the audio bus 42 may subsequently be returned to the DSP 22 via the audio sample bus 42 for processing by a different DSP thread.

Data written to an available input or output sample-synchronous audio bus buffer 48, 50 for inter-thread data passing may be immediately visible to all threads for the remainder of the sample period in which it was written. This restriction may only apply to inter-thread data passing, not to data being passed to and from the sample-synchronous audio bus 42 as described above. In the time from the beginning of a sample period up to the time that a thread writes to an available buffer location, any data read from a the same buffer location by a different DSP thread may be two sample periods old, in accordance with the aforementioned double-buffering ping-pong scheme used.

Thus, in an embodiment where each DSP thread processes a different effect, inter thread passing may be used to pass sample data between different effects being processed. Sample data may thus be passed from a time domain processing or sample-by-sample effect/algorithm to a frequency domain effect or block-based effect/algorithm. An exemplary frequency domain effect is an audio clean-up effect which may remove crackles in an audio stream or enhance certain sub-bands of an audio spectrum.

When block-based processing on a unit or block of samples is required, individual samples may be sequentially received via the audio bus 42 and stored in memory of the DSP 22. When all data samples comprising the block or unit have been received, the block of data samples may be processed. For example, a time domain DSP thread may read individual samples from the audio bus 42 and write the samples one at a time to a circular buffer associated with the thread. When the associated buffer is full, the time domain thread may ping or inform a frequency domain routine that the block of data is available for frequency domain processing. Thus, in one embodiment, time domain threads may gather data for frequency domain threads. Likewise, blocks of data that have been processed by the DSP 22 may be written to the audio bus 42 one sample at a time. Further, an output data sample of a frequency domain algorithm (e.g., bass boost) or process may be passed as an input data sample to a time domain algorithm or process (e.g., reverberation).

Figure 6:
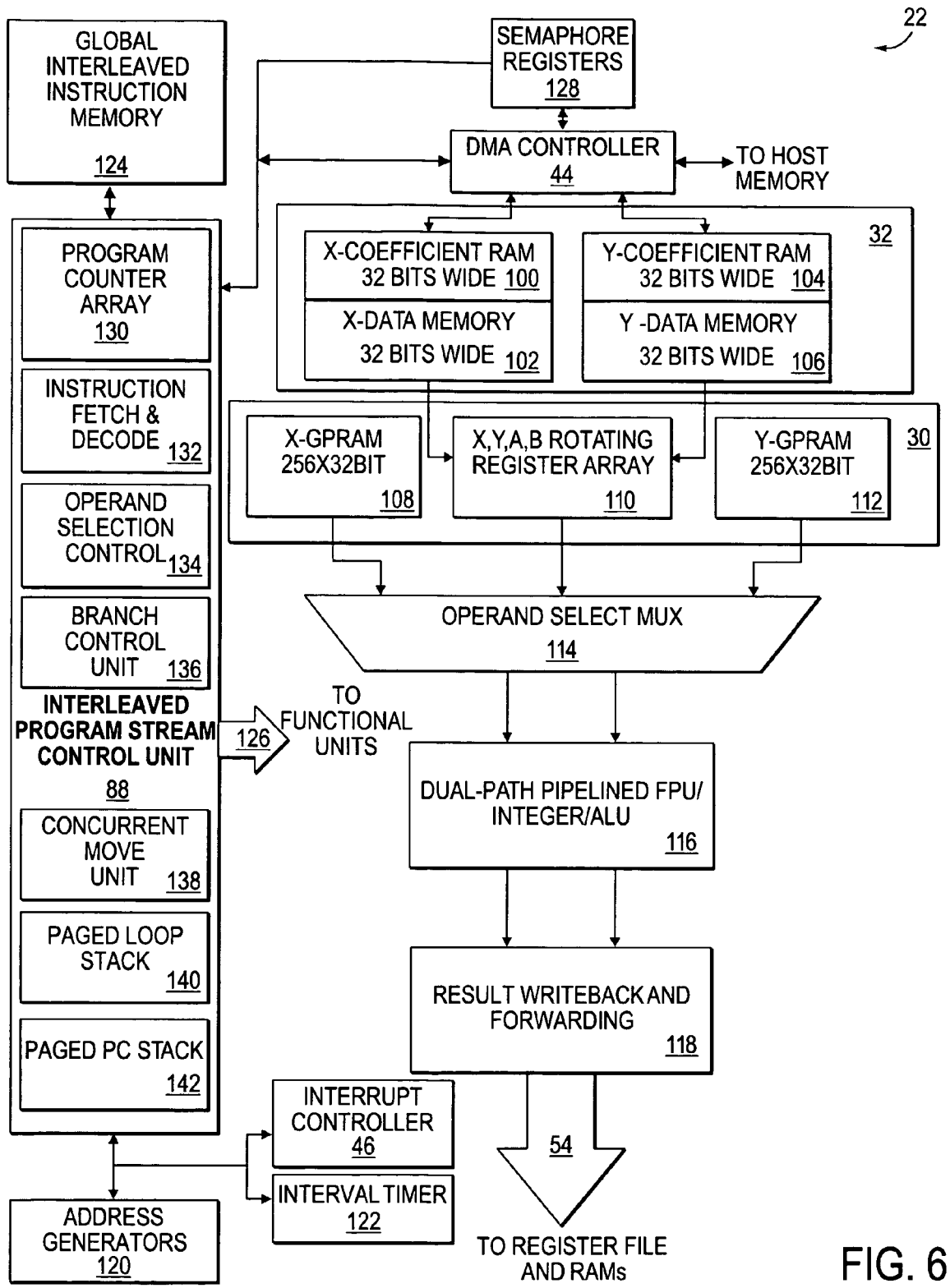
FIG. 6 shows further detail of the exemplary DSP of FIG. 5.

Referring in particular to FIG. 6, a more detailed embodiment is shown of the exemplary DSP 22. The DSP 22 includes the DSP control unit 88, the X and Y memory 32, the general purpose registers 30, the nested interrupt controller 46, and, optionally, the DMA controller 44. In one exemplary embodiment, the general purpose registers 30 may be a relatively large register set to store data samples of multiple audio channels. The X and Y memory 32 may include X-coefficient RAM 100 and X-data memory 102. Likewise, the X and Y memory 32 may include Y-coefficient RAM 104 and Y-data memory 106. For example, the X-coefficient RAM 100 and the Y-coefficient RAM 104 may be 32 bits wide and the X-data memory 102 and the Y-data memory 104 may also be 32 bits wide. The X and Y memory 32 defines common or shared memory used by frequency and time domain engines 26, 28 to process frequency domain threads and time domain threads. Thus, the X and Y memory 32 is shared memory and allows threads to pass or exchange sample data to each other. The general purpose registers 30 include X-general purpose RAM (X-GPRAM) 108, an X, Y, A, B rotating register array 110, and Y-general purpose RAM (Y-GPRAM) 112. In one exemplary embodiment, the X-GPRAM 108 and the Y-GPRAM 112 are 256×32 bits. Outputs from the X-GPRAM 108, the X, Y, A, B rotating register array 110 and the Y-GPRAM 112, are fed into an operand max 114. In one embodiment, the X-GPRAM 108, the X, Y, A, B rotating register array 110, and the Y-GPRAM 112 may be arranged per DSP thread and sample data is fed into an operand select mux 114 in a sample-by-sample fashion. The operand select mux 114 feeds a dual-path pipelined FPU/integer unit/ALU 116 that performs math and logical operations which, in turn, feeds circuitry 118 provided for result write back and forwarding. Processed samples are then written to register files and RAMs in the sample synchronous audio buffer 50 via the I/O data path 54.

Address generators 120 are connected to the DSP control unit 88, the interrupt controller 46, and an interval timer 122. The DSP control unit 88 is also connected to global interleaved instruction memory 124 (e.g., including frequency and time domain algorithms) and to various functional units (e.g. effects processors) as shown by bus 126. In addition, in one embodiment the DSP control unit 88 is connected to the DMA controller 44 and semaphore registers 128. By way of example, the DSP control unit 88 is shown to include a program counter array unit or module 130, an instruction fetch and decode unit or module 132, an operand selection control unit 134, a branch control unit 136, a concurrent move unit 138, a paged (per thread) loop stack 140, and a paged (per thread) program counter (PC) stack 142.

Figure 7:
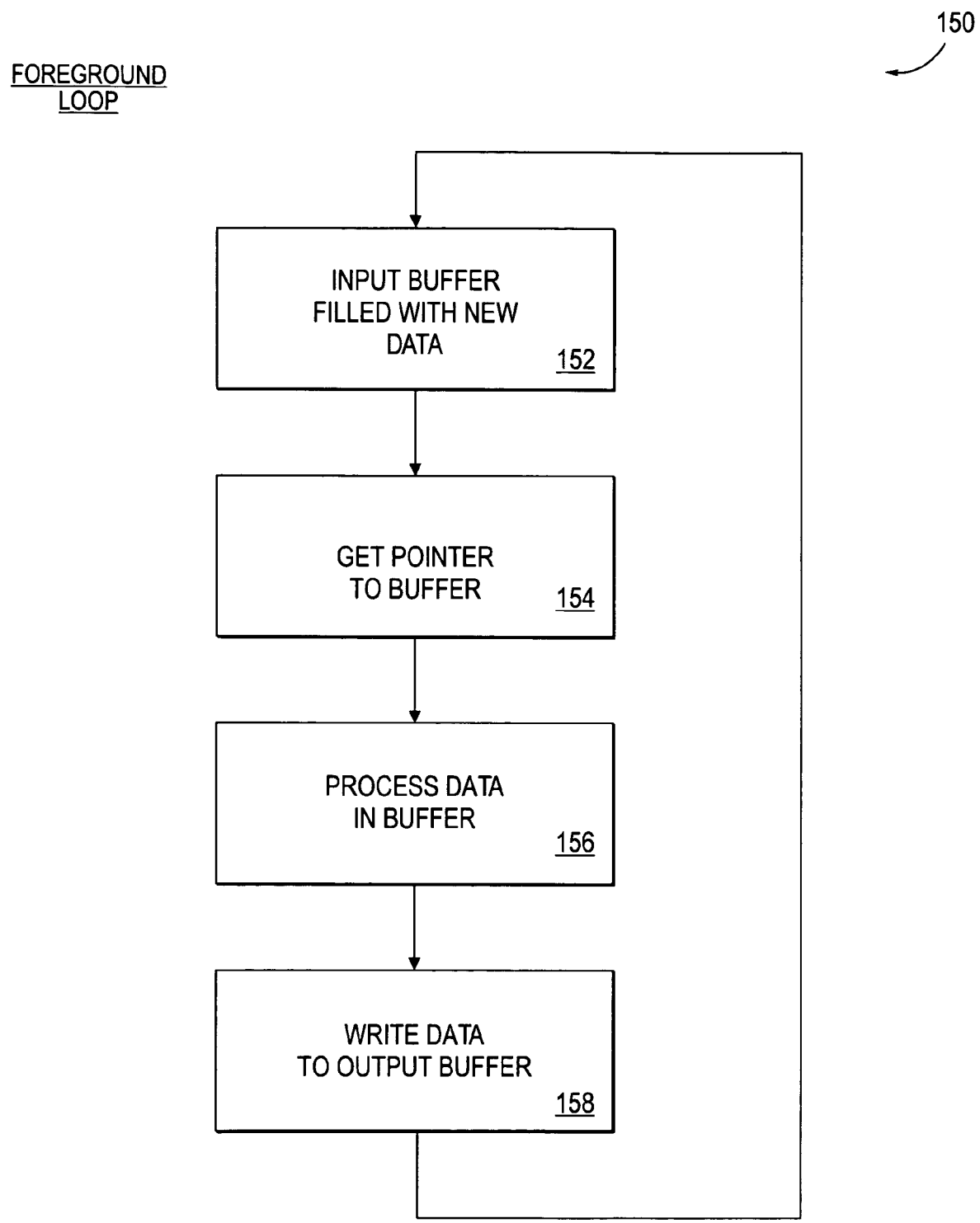
FIG. 7 shows a schematic flow diagram of an exemplary basic method for performing foreground routines or processing.

Referring in particular to FIG. 7, reference numeral 150 generally indicates an exemplary method, in accordance with the invention, for performing foreground routines or functionality in the DSP 22. The method 150 may first, as shown at operation 152, check to determine whether or not the input buffer 48 is filled with new data for processing. If so, the method 150 may then get a pointer to the appropriate buffer as shown at operation 154 and, thereafter, process the data in the buffer (see operation 156). Thereafter, as shown at operation 158, the data is written back to the audio output buffer 50. As mentioned above, the method 150 is typically used in a foreground loop to execute frequency domain algorithms or block based algorithms. Further, when the DSP 22 receives the time domain interrupt 36, it exits the method 152 and executes a background time domain interrupt subroutine. In one embodiment, the method 150 may be executed by a thread of the DSP 22 and may run a micro-kernel program analogous to a "mini operating system" or OS thereby to control operation of the DSP 22. Thus, the thread may take care of routing incoming sample streams, route each stream to an appropriate effects engine of the DSP 22 for processing, and write or communicate processed sample streams back to the audio bus 42.

Figure 4:
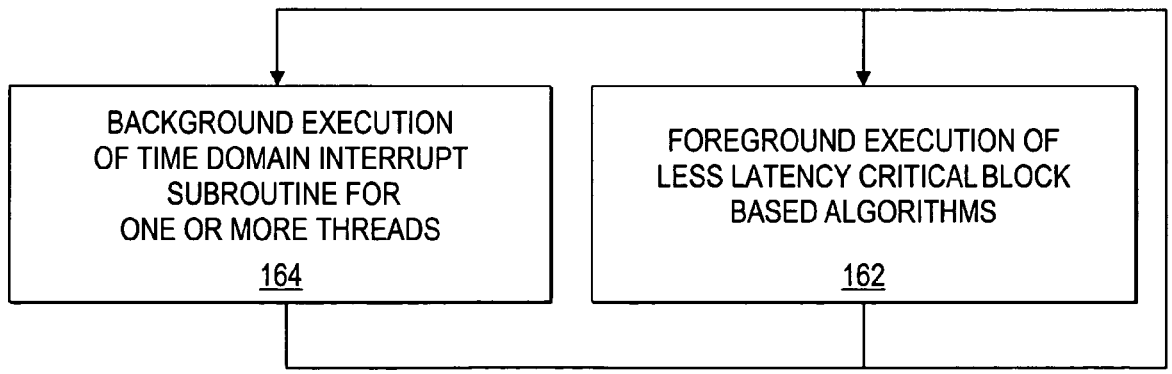
FIG. 4 shows a schematic flow diagram of foreground and background processing within an exemplary digital signal processor (DSP)
Figure 8:
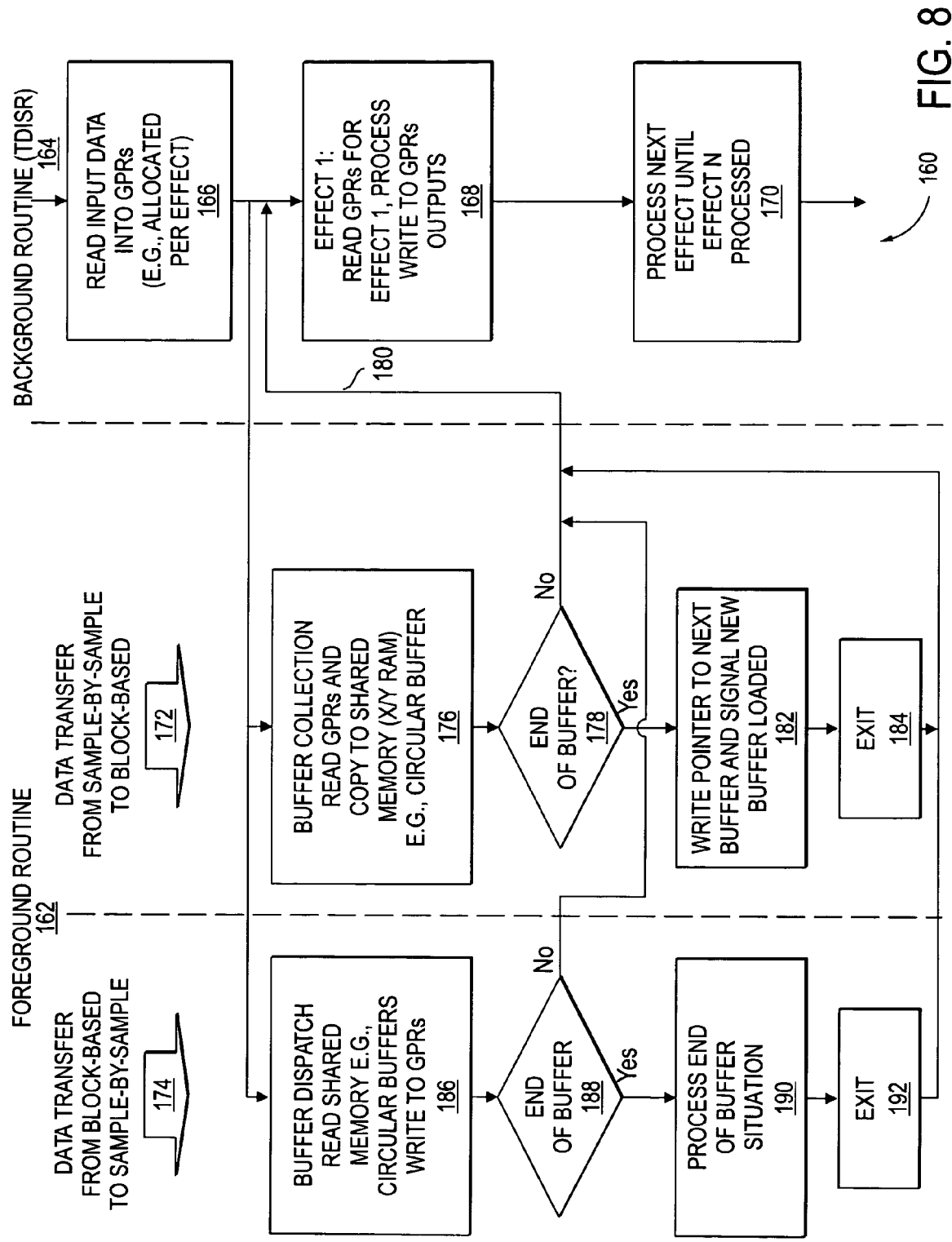
FIG. 8 shows a schematic flow diagram of an exemplary interaction between sample-by-sample and block-based functionality using a common or shared memory.

Referring in particular to FIG. 8, reference numeral 160 shows exemplary interaction between a foreground routine 162 and a background routine 164 (see also FIG. 4). As mentioned above, the exemplary background routine is entered when an interrupt 36 occurs. As shown at operation 166, input sample data is read into the general purpose registers 30 and, in one embodiment, the general purpose registers 30 are allocated per effect. Accordingly, each effect that the DSP 22 processes has its own dedicated general purpose registers. Thereafter, as shown at operations 168 and 170, each effect is then individually processed. For example, effect 1 may be processed at operation 168 and, when processing the effect, the general purpose registers 30 for effect 1 may be read, the data samples in the register may be processed and, thereafter, written to the general purpose register outputs. This procedure may continue until all effects have been processed (see operation 170).

However, as described above, data samples may be passed between the background routine 164 and the foreground routine 162. In particular, data samples may be transferred from sample-by-sample processing to block-based processing threads as generally indicated by arrow 172. Likewise, data samples may be transferred from block-based processing threads to sample-by-sample processing threads as generally indicated by arrow 174.

Returning to the data transfer from sample-by-sample to block-based threads (see arrow 172), at operation 176 data may be received from the background routine 164 and a buffer collection routine may read the general purpose registers 30 and copy the data samples in their registers to the shared memory provided, by way of example, in the X and Y memory 32. In one exemplary embodiment, the buffer may be a circular buffer. Thereafter, as shown at decision operation 178, it is determined whether or not the end of the buffer has been reached and, if so, the data transfer routine may return to the background routine as shown by line 180. However, if not, as shown at operation 182 a pointer may be wrapped and a signal generated to show that a new buffer should be loaded whereafter, as shown at operation 184, the data transfer routine may return to the background routine 164.

In a similar fashion, the transfer of data samples from block-based algorithms to sample-by-sample algorithms may be accomplished using the transfer routine (see arrow 174).

As shown at operation 186, a buffer dispatch routine may read the shared memory (e.g., the X and Y RAM 32) and, for example, circular buffers may write the data samples to the general purpose registers 30. As shown at decision operation 188, if the end of the buffer has not been reached, then the data transfer routine may return to the background subroutine 164. If, however, the end of the buffer has been reached, then an end of buffer situation may be processed in an appropriate way for a given DSP architecture (see operation 190). Thereafter, the foreground routine 162 may be exited and the background routine 164 may take charge once again.

Figure 9:
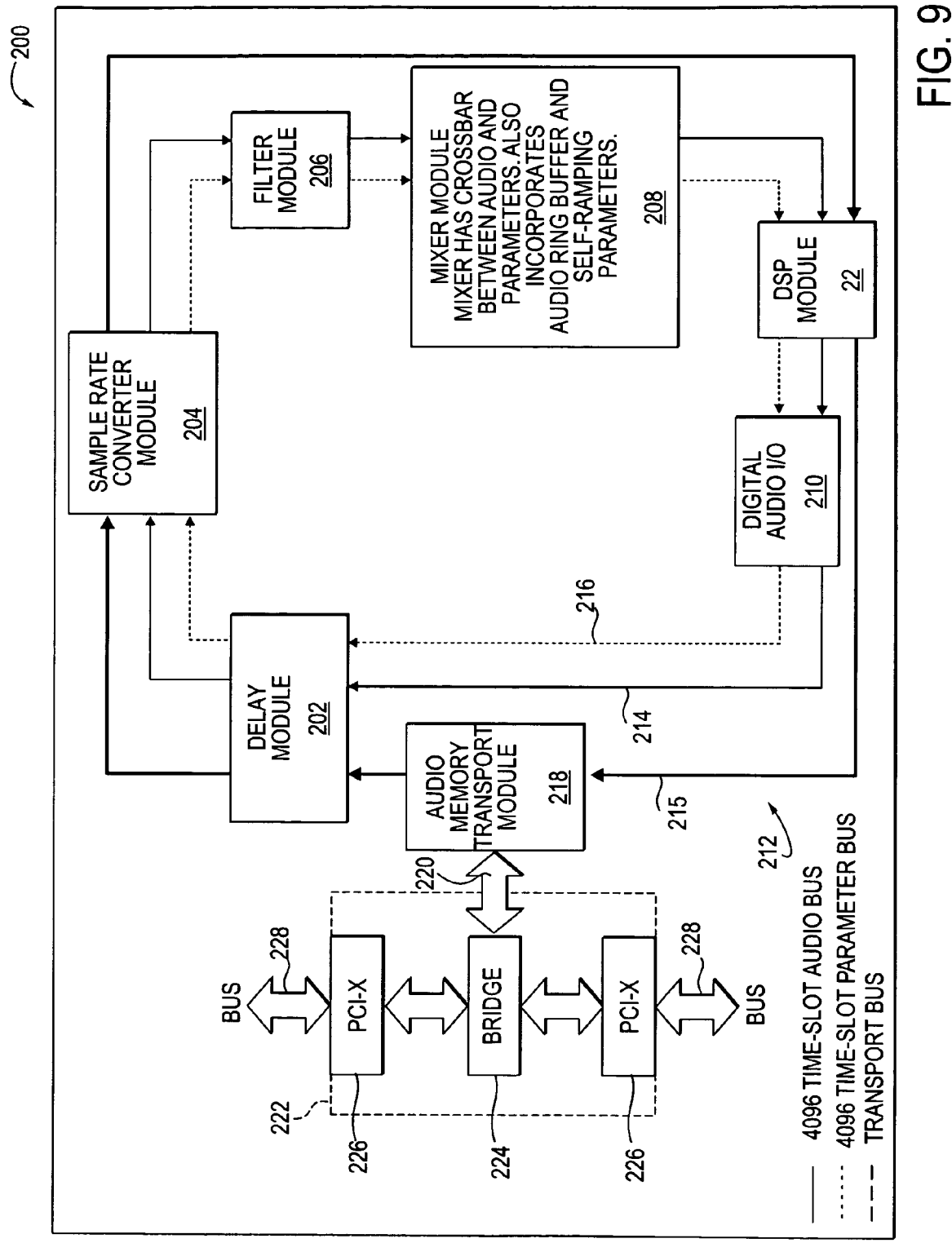
FIG. 9 shows a schematic flow diagram of an exemplary digital processing system or subsystem, in accordance with one embodiment of the invention, including a DSP module in accordance with the invention.

An exemplary implementation of the DSP module 22 is shown in FIG. 9. In particular, reference numeral 200 generally indicates a schematic block diagram of an exemplary digital processing device in accordance with an aspect of the present invention. The device 200 is shown to include a plurality of processing modules, namely, a digital signal processing (DSP) module 22, a delay module 202, a sample rate converter (SRC) module 204, a filter module 206, and a mixer module 208. The device 200 further includes a digital audio input/output (I/O) module 210 and an audio memory transport module 218. The modules 22, 202-210 are interconnected serially via a data path 212 which is arranged in a ring configuration wherein data is sequentially communicated from any one processing module to any other processing module. Unlike conventional digital processing devices, the device 200 in accordance to the invention allows each module 22, 202-210 to communicate data with any other module 22, 202-210 connected to the data path 212 as described in more detail below. In one embodiment of the invention, the data path 212 is time division multiplexed wherein a routing controller controls communication of data between the various modules 22, 202-210. Further, it is to be appreciated, that the modules 22, 202-210 are merely exemplary modules and further modules (with the same or differing processing capabilities) may be included in the device 200 and/or any one or more of the modules may be removed and, for example, its functionality included within any other module.

Thus, in one embodiment, any one of the modules 22, 202-210 may communicate data to any one or more of the other modules 22, 202-210 under control of a routing controller. Accordingly, data being processed by the digital processing device 200 may be flexibly routed between different modules 22, 202-210 and need be not restricted to predetermined pathways as in the case of conventional devices. It will be appreciated that a module 22, 202-210 may also communicate data back to itself via an audio bus 214. Accordingly, repeated processing may be performed on the data by the same processing module. The processing module 22, 202-210 that provides the data to the data path 212 may be viewed as a source processing module, and the particular processing module 22, 202-210 that is to process the data may be viewed as a target or destination processing module. As a processing module 22, 202-210 may return processed data to itself, in one mode of operation a processing module 22, 202-210 may define both the source and destination processing module. Thus, for example, the filter module 206 may form a cascaded filter arrangement where its output or processed data may be sent back to itself for further processing prior to being sent to another processing module 22, 202-210.

The audio memory transport module 218 communicates via a bus 220 with an interface module 222 which, for example, may form part of a bus of a computer device (for example a personal computer or PC). In one embodiment, the interface module 222 includes a bridge 224 and two PCI-X bus interfaces 226 that interface the bridge 224 to a conventional PC bus 228. The digital I/O module 210 may receive a digital audio input and provide digital audio output to an output device. The data path 212 serially interconnects the modules 22, 202-202-210 and 218.

The data path 212 of the device 200 includes a media data path in the exemplary form of an audio data path or audio bus 214 (which corresponds in this embodiment to the data bus 42 in FIG. 1), and a processing control path in the exemplary form of a parameter bus 216. In one embodiment, both the audio bus 214 and the parameter bus 216 are arranged in a ring configuration wherein data is communicated between the various processing modules 22, 202-210 in a time division multiplexed fashion. Accordingly, sample data may be sequentially received by the sample-synchronous audio input buffer 48 and fed into the DSP 22. Likewise, processed sample data may be output from the sample-synchronous audio output buffer 50 to the audio bus 214. The sample locked timebase module 38 may monitor the audio bus 214 and output its interrupt 36 upon detection that a full loop of data samples has been read from the audio ring or bus 214. As the various modules are located along the audio bus 214, audio data may be routed between modules without requiring the data to be routed through a central hub (e.g., the DSP 22). In certain embodiments, the device 200 includes a transport bus 215 which interfaces an external computer via the audio memory transport module 218 to the processing modules 22, 208-210.

Figure 10:
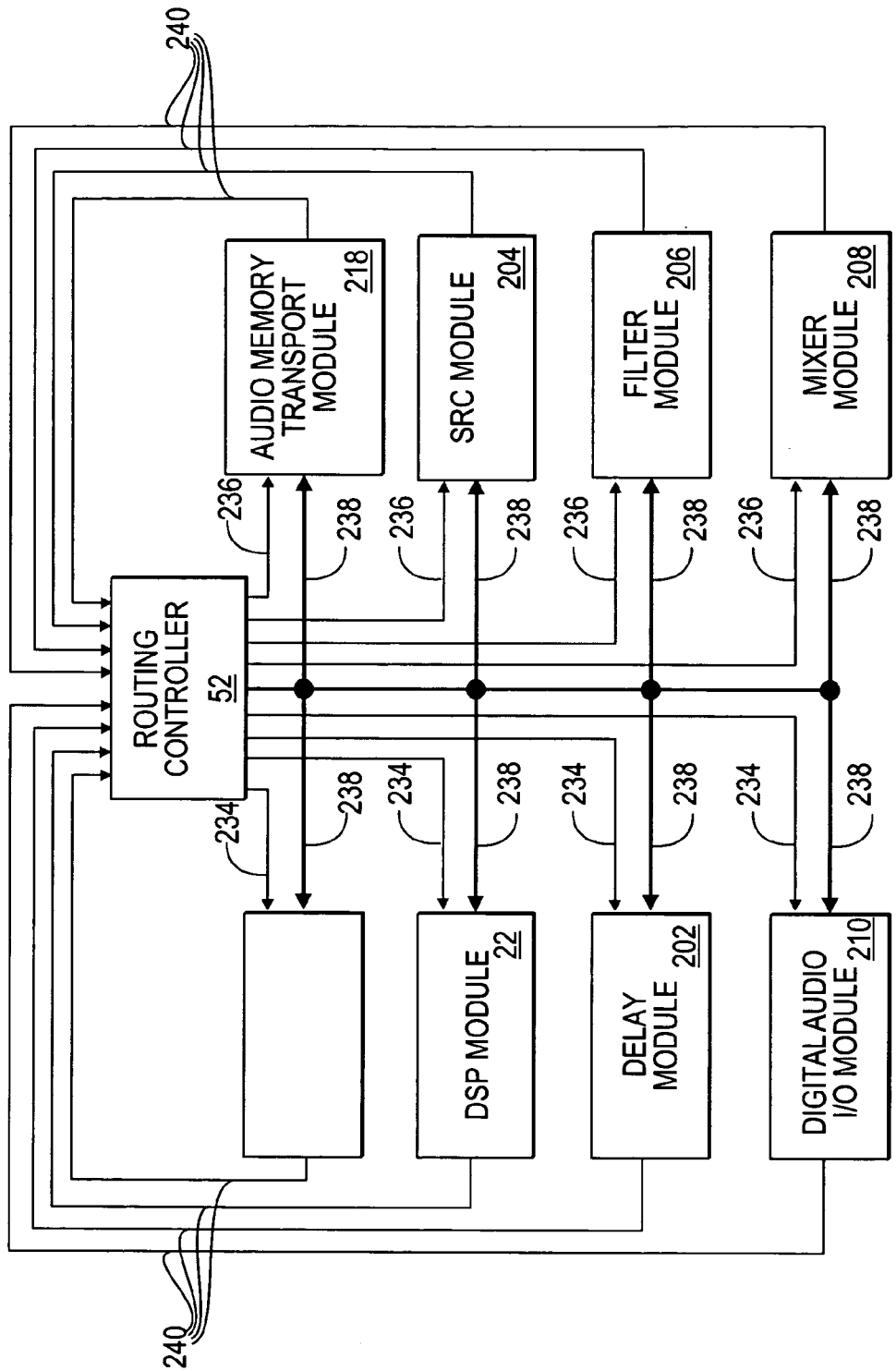
FIG. 10 shows a schematic block diagram of an exemplary routing controller or host interface, in accordance with an embodiment of the invention, for routing digital data in the digital processing system of FIG. 9.

In order to control the routing of data on the data path 212 (including, for example, the audio bus 214, the parameter bus 216 and the transport bus 215) the device 200, in certain embodiments, includes a host interface or routing controller 230 (see FIG. 10) which controls the routing of data along the data path 212. In particular, as generally indicated by reference numeral 232, in one embodiment the routing controller 230 controls the routing of data to each processing module 22, 202-210 and 218 via chip select lines 236 and address, write data, and write enable lines 238. Each module 22, 202-210 and 218 communicates data to the host interface or routing controller 230 via read data and acknowledge lines 240. In one embodiment, the routing controller 230 defines a host interface that uses a full synchronous hand-shake approach that interfaces the various processing modules 22, 202-210 and 218 of the device 200. For example, the routing controller 230 may generate a chip select that is held active until an acknowledge signal is received from a selected processing module 22, 202-210 and 218. In one embodiment, the routing controller 230 decodes the most significant bits of a host address and, in response thereto, generates a chip select that enables the selected processing module 22, 202-210 and 218. Each module 22, 202-210 and 218 may locally decode the remaining least significant bits of the hosts address that are significant thereby to identify the specific module 22, 202-210 and 218 to which data is to be routed.

In one embodiment of the invention, the DSP module 22 is interfaced to the routing controller 230 in such a fashion so that the DSP module 22 has access to registers and random access memory (RAM) provided in each of the modules 22, 202-210 and 218. In particular, as shown in FIG. 11, the DSP module 22 may communicate with the routing controller 230 via a data bus 242, an address bus 244, acknowledge lines 248, write enable lines 250, a request line 252 and a chip select line 254. In order to access registers and RAM that may be provided in the modules 202-210 and 218, the DSP module 22 communicates a request via line 252 to the routing controller 230. The routing controller 230 may then acknowledge the request via the acknowledge line 248 whereafter the requested functionality may be executed using the address bus 244 and data bus 242.

In embodiments in which a sample rate tracker is provided within the digital audio I/O module 210, it may also be interfaced to the routing controller 230 thereby providing access to registers and/or RAM in the modules 22, 202-210 and 218. In one embodiment, the device 200 has two base address registers, one mapped to I/O and the other mapped to memory. Both of these registers may be active simultaneously and, both address registers may allow access to the same internal registers and memories of a chip on which the device 200 is provided.

In one embodiment of the invention, the audio bus 214 provides audio channels that are time division multiplexed. Each processing module 22, 202-210 and 218 may have a fixed output time-slot allocated to it and a programmable or variable input time-slot. Thus, in this embodiment, the modules 22, 202-210 and 218 may always output data in the same predetermined time-slot to the audio bus 214 but receive data in different time-slots under control of the routing controller 230. Thus, as the input time-slot associated with each individual module 22, 202-210 and 218 is programmable, data may be routed between the various modules 22, 202-210 and 218 in a flexible fashion. A channel identification bus may be provided to identify the module 22, 202-210 and 218 with which the time-slot is associated. In one embodiment, the channel identification bus identifies a source processing module 22, 202-210 and 218 and a target or destination processing module 22, 202-210 and 218 includes a list to identify data sources from which data is to be processed. However, it will be appreciated that the channel identification may also identify a target processing module 22, 202-210 and 218. In one embodiment, the channel identification may be monitored by the sample-locked timebase module 38 so as to generate an interrupt 36 after a sample from each channel has been received. Thus, prior to a new set or group of samples (one sample for each channel provided) being received, the interrupt 36 is generated. Accordingly, as described above, the DSP 22 would then process the set of sample data using, for example, the Time Domain Interrupt Subroutine. Thus, the time domain processing or sample-by-sample processing of data samples received via the audio bus 42 may be synchronized with the transport of data via the audio bus 214. To this end, the ping-pong buffers 48 and 50 may flip each time the interrupt 36 is generated. In one exemplary embodiment, the audio bus 42 of FIG. 1 (corresponding for example to the audio bus 214 in FIG. 9) may viewed analogously to a circular buffer including a data sample for a plurality of data channels and, once a data sample for each channel has been read the "circular buffer" wraps around. At this exemplary point the interrupt 36 may be generated so as to provide sample synchronous data samples to the DSP 22.

In certain embodiments, the device 200 allows digital data (e.g., digital audio data) to be communicated along the audio bus 214 at differing sample rates (e.g., sample rates set by the DSP module 22). For example, in one embodiment of the invention, 4096 buffer channels or time-slots are provided on the audio bus 214. In this exemplary configuration, the audio bus 214 may then support sample rates of up to 384 kHz by allocating one time-slot for 48 kHz, two time-slots for 96 kHz, four time-slots for 192 kHz, and eight time-slots for 384 kHz. Thus, since there are 4096 total channels or time-slots in the given sample, only 2048 channels or time-slots are available at 96 kHz, 1024 time-slots available at 192 kHz, and 512 time-slots are available at 384 kHz. It is, however, to be appreciated that the number of time-slots for each sample rate at any given time during operation of the device 200 may vary and, for example, situations could arise where, for example, 3348 48 kHz time-slots are provided, 204 96 kHz time-slots are provided, and 85 192 kHz time-slots may be provided. However, the various configurations (e.g., bit-rates) or numbers of time-slots may vary depending upon the functionality to be executed by the device 200. For example, in other embodiments programmable operating clock frequencies may be provided. For example, clock frequencies of 150 MHz, 175 MHz, and 200 MHz may be provided that correspond to 20072, 3584, and 4096 time-slots respectively. It is, however, to be appreciated that these are merely examples of frequencies and time-slots and that they may change from embodiment to embodiment. Thus, in one embodiment, the media data path may include a total number of time-slots for communicating media data at a plurality of different bit rates wherein the sum of a number of time-slots allocated to each one of the plurality of bit rates equals the total number of time-slots. The sample-locked timebase module 210 will generate is interrupt 36 as frequency that is dependent upon the sample rate on the audio bus 214.

In certain embodiments, arbitrary sample rates, such as the CD standard of 44.1 kHz, may be communicated or routed via the audio bus 46 using an indicator bit (e.g. a valid bit) that indicates to a receiving module 22, 202-210 and 218 that a new valid sample is to be retrieved or extracted from the audio bus 214 for processing. When an arbitrary sample rate (such as the 44.1 kHz sample rate) is communicated via the audio bus 214, and the exemplary valid bit is high, the respective module 22, 202-210 and 218 may accept the data as valid. Whereas, when the valid bit goes low, the module 22, 202-210 and 218 is thereby informed that the subsequent samples may be disregarded.

Although in one embodiment variable sample rates may be communicated via the audio bus 214, the parameter bus 216 may communicate control data at a fixed sample rate (e.g. 48 kHz) that may be independent of the sample rate of the audio bus 214.

In one embodiment, the audio bus 214 communicates audio data to be processed by the various modules 22, 202-210 and 218. However, the parameter bus 216 includes parameter or processing data which is used by an associated module 22, 202-210 and 218 to define the functionality (e.g., algorithm) of the associated module 22, 202-210 and 218. Accordingly, the control data may thus control how the data on the audio bus 214 will be processed by the particular module 22, 202-210 and 218. For example, the parameter bus 214 may be used to communicate filter parameters to the filter module 206, sample rate conversion parameters to the sample rate converter module 204, delay data to the module 202 that defines the period by which the digital audio will be delayed, and so on. Thus, sample-by-sample or time based algorithm data and block-based algorithm data may be communicated to the DSP 22 to execute selected algorithms.

It will be appreciated that, in order to reduce any processing latencies in the device 200, the parameter data should be provided to each of the processing modules 22, 202-210 and 218 prior to the time slot which each particular processing module 22, 202-210 and 218 is to output processed audio data. Accordingly, parameter data is communicated via the parameter bus 216 to a particular processing module 22, 202-210 and 218 prior to the audio data arriving at the processing module 22, 202-210 and 218 via the audio bus 214.

The invention extends to a machine-readable medium (e.g., RAM) including instructions/software that when executed by a machine (e.g., a PC, a processor or the like) causes the machine to execute any functionality described herein. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, method and device to process digital media streams have been described. Although, the invention is described with reference to processing a digital media stream in the form of a digital audio stream, it is however to be appreciated that the invention may be applied to the processing of any other digital media streams, for example, digital video streams or the like. Further, although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A digital processor to process digital samples, the processor comprising:
   a time domain processing engine to process a digital sample in the time domain;
   a frequency domain processing engine to process a digital sample in the frequency domain; and
   shared memory provided in the digital processor with which time domain processed samples and frequency domain processed samples are exchangeable,
   wherein frequency domain processing is performed by the frequency domain processing engine in a foreground routine, and
   wherein time domain processing is performed by the time domain processing engine in a background routine that is entered into in response to a sample-rate locked interrupt.

2. The processor of claim 1, wherein the time domain processing engine processes data samples in a sample-by-sample manner and the frequency domain processing engine processes data samples in a block-based manner,
   wherein the sample-rate locked interrupt is generated based on a digital sample bus, and
   wherein the processor further comprises:
   an input buffer to receive an input data sample from the digital sample bus in response to the sample-rate locked interrupt; and
   an output buffer to provide an output data sample to the digital sample bus in response to the sample-rate locked interrupt.

3. The processor of claim 1, wherein the time domain processing engine and the frequency domain processing engine are integrated in a single Digital Signal Processor (DSP) chip.

4. The processor of claim 3, wherein the shared memory is X and Y Random Access Memory (RAM) provided on the DSP chip.

5. The processor of claim 1, which comprises at least one Input/Output buffer that interfaces the processor to a digital sample bus that provides the digital samples to the processor and receives processed digital samples from the processor in response to the sample-rate locked interrupt.

6. The processor of claim 5, wherein the digital sample bus is one of a digital audio bus and a digital video bus that is sample synchronous.

7. The processor of claim 6, wherein the digital sample bus communicates the digital samples in a plurality of time-slots which provide data samples to and receive data samples from the processor.

8. The processor of claim 5, which comprises an input buffer to receive data samples from the digital sample bus and an output buffer to provide data samples to the digital sample bus.

9. The processor of claim 8, wherein the input buffer and output buffers are ping-pong buffers.

10. The processor of claim 8, which comprises an interrupt generator that generates the sample-rate locked interrupt based on the digital sample bus, wherein the input buffer communicates an input data sample to the processor in response to the interrupt and the output buffer communicates an output data sample to the digital sample bus in response to the sample-rate locked interrupt.

11. The processor of claim 5, wherein digital samples are exchanged between the DSP and the digital sample bus on a sample-by-sample basis.

12. The processor of claim 1, in which the processor is a thread-interleaved Digital Signal Processor (DSP) and a digital sample is exchangeable between a thread of the time domain processing engine and the frequency domain processing engine via the shared memory.

13. The processor of claim 1, which comprises and input buffer and an output buffer wherein the processor:
   selectively extracts a digital sample for processing from a digital sample bus, the digital sample being provided in at least one time-slot of the digital sample bus allocated to the processor;
   selectively inserts a processed digital sample into its allocated time-slot; and
   passes a digital sample that it receives and that is associated with other processing devices unchanged along the digital sample bus.

14. The processor of claim 1, which:
   accumulates digital samples from a digital sample bus in a sample-by-sample fashion;
   identifies when a block of digital samples has been received;
   processes the block in the frequency domain when a complete block has been received; and
   communicates a processed block of samples to the digital sample bus in a sample-by-sample fashion.

15. The processor of claim 1, wherein the digital sample bus is a time division multiplexed bus arranged in a ring configuration.

16. The processor of claim 15, wherein the digital sample bus comprises:
   a plurality of media channels defined by time division multiplexed time-slots; and
   a channel identification path including channel identification data to identify each media channel to the processor.

17. The processor of claim 1 wherein the sample-rate locked interrupt is generated in response to the identifier that identifies when a digital sample for a channel has been received by the processor.

18. The processor of claim 1, wherein the processor is provided in a very large scale integration (VLSI) circuit of a digital audio processing device.

19. A method to process data samples in a digital processor, the method comprising:
   storing data samples in shared memory provided in the digital processor;
   processing digital samples provided in the shared memory in the time domain; and processing digital samples provided in the shared memory in the frequency domain, wherein time domain processed samples and frequency domain processed samples are exchangeable via the shared memory, wherein the frequency domain processing is performed in a foreground routine, and wherein the time domain processing is performed in a background routine that is entered into in response to a sample-rate locked interrupt.

20. The method of claim 19, wherein during time domain processing, data samples are processed in a sample-by-sample manner and, in the frequency domain data samples are processed in a block-based manner, wherein method further comprises;

generating the sample-rate locked interrupt based on a digital sample bus, receiving an input data sample from the digital sample bus in response to the sample-rate locked interrupt; and providing an output data sample to the digital sample bus in response to the sample-rate locked interrupt.

21. The method of claim 19, which comprises processing data samples in the time domain and the frequency domain data in a single integrated Digital Signal Processor (DSP) chip.

22. The method of claim 19, wherein the shared memory is X and Y Random Access Memory (RAM) provided on the DSP chip, the method comprising exchanging sample data between the RAM and a time domain processing engine, and between the RAM and a frequency domain processing engine.

23. The method of claim 19, which comprises interfacing the processor to a digital sample bus via at least one Input/Output buffer, the Input/Output buffer providing the digital samples to the processor and receiving processed digital samples from the processor in response to the sample-rate locked interrupt.

24. The method of claim 23, wherein the digital sample bus is one of a digital audio bus and a digital video bus that is sample synchronous.

25. The method of claim 24, which comprises communicating the digital samples between the processor and the sample bus in a plurality of time-slots that provide data samples to and receive data samples from the processor.

26. The method of claim 23, which comprises receiving data samples via an input buffer from the digital sample bus and providing via an output buffer data samples to the digital sample bus.

27. The method of claim 26, wherein the input buffer and output buffers are ping-pong buffers.

28. The method of claim 26, which comprises generating the sample-rate locked interrupt based on the digital sample bus, wherein the input buffer communicates an input data sample to the processor in response to the sample-rate locked interrupt and the output buffer communicates an output data sample to the digital sample bus in response to the sample-rate locked interrupt.

29. The method of claim 23, wherein comprises exchanging digital samples between the processor and the digital sample bus on a sample-by-sample basis.

30. The method of claim 19, in which the processor is a thread-interleaved Digital Signal Processor (DSP), the method including exchanging a digital sample between a thread of a time domain processing engine and a frequency domain processing engine via the shared memory.

31. The method of claim 19, wherein the processor comprises and input buffer and an output buffer, the method comprising:

selectively extracting a digital sample for processing from a digital sample bus, the a digital sample being provided in at least one time-slot of the digital sample bus allocated to the processor;

selectively inserting a processed digital sample into its allocated time-slot; and passing a digital sample that it receives and that is associated with other processing devices unchanged along the digital sample bus.

32. The method of claim 19, which comprises:

accumulating digital samples from a digital sample bus in a sample-by-sample fashion;

identifying when a block of digital samples has been received;

processing the block in the frequency domain when a complete block has been received; and communicating a processed block of samples to the digital sample bus in a sample-by-sample fashion.

33. The method of claim 19, which comprises arranging the digital sample bus in a time division multiplexed bus in a ring configuration.

34. The method of claim 33, which comprises:

providing a plurality of media channels in time division multiplexed time-slots; and providing a channel identification path including channel identification data to identify each media channel to the processor.

35. The method of claim 19 further comprising:

identifying when a digital sample from a channel has been received by the processor; and generating the sample-rate locked interrupt in response to the identifier.

36. The method of claim 19, wherein the method is performed in a very large scale integration (VLSI) circuit of a digital audio processing device.

37. A computer medium that stores instructions that, when executed, cause one or more processors to:

store data samples in shared memory provided in a digital processor;

process digital samples provided in the shared memory in the time domain; and process digital samples provided in the shared memory in the frequency domain, wherein time domain processed samples and frequency domain processed samples are exchangeable via the shared memory, wherein the frequency domain processing is performed in a foreground routine, and wherein the time domain processing is performed in a background routine that is entered into in response to a sample-rate locked interrupt.

38. The computer-readable medium of claim 37, wherein the instructions cause the one or more processors during time domain processing to process data samples in a sample-by-sample manner and to process data samples in a block-based manner during frequency domain processing, and wherein the instructions cause the sample-rate locked interrupt to be generated based on a digital sample bus, cause an input buffer to receive an input data sample from the digital sample bus in response to the sample-rate locked interrupt; and cause an output buffer to provide an output data sample to the digital sample bus in response to the sample-rate locked interrupt.

39. The computer-readable medium of claim 37, wherein the instructions cause the one or more processors to process data samples in the time domain and the frequency domain in a single integrated Digital Signal Processor (DSP) chip.

40. The computer-readable medium of claim 37, wherein the shared memory is X and Y Random Access Memory (RAM) provided on the DSP chip and the instructions cause the one or more processors to exchange sample data between the RAM and a time domain processing engine, and between the RAM and a frequency domain processing engine in response to the sample-rate locked interrupt.

41. The computer-readable medium of claim 37, wherein the instructions cause the one or more processors to communicate the digital samples between the processor and a sample bus in a plurality of time-slots that provide data samples to and receive data samples from the processor.

42. The computer-readable medium of claim 37, wherein the instructions cause the one or more processors to generate the sample-rate locked interrupt based on a digital sample bus, and wherein an input buffer communicates an input data sample to the processor in response to the sample-rate locked interrupt and an output buffer communicates an output data sample to the digital sample bus in response to the sample-rate locked interrupt.

43. The computer-readable medium of claim 37, wherein the instructions cause the one or more processors to exchange digital samples between the processor and a digital sample bus on a sample-by-sample basis.

44. The computer-readable medium of claim 37, in which the processor is a thread-interleaved Digital Signal Processor (DSP), and wherein the instructions cause the one or more processors to exchange a digital sample between a thread of a time domain processing engine and a frequency domain processing engine via the shared memory.

45. The computer-readable medium of claim 37, wherein the instructions cause the one or more processors to:
   accumulate digital samples from a digital sample bus in a sample-by-sample fashion;
   identify when a block of digital samples has been received;
   process the block in the frequency domain when a complete block has been received; and
   communicate a processed block of samples to the digital sample bus in a sample-by-sample fashion.

46. The computer-readable medium of claim 37, wherein the instructions cause the one or more processors to:
   provide a plurality of media channels in time division multiplexed time-slots;
   provide a channel identification path including channel identification data to identify each media channel to the processor;
   identify when a digital sample from each channel has been received by the processor; and generate the sample-rate locked interrupt in response to the identifier.

* * * * *

UNITED STATES PATENT AND TRADEMARK OFFICE
CERTIFICATE OF CORRECTION

PATENT NO.       : 7,457,484 B2  
APPLICATION NO.  : 10/875259  
DATED            : November 25, 2008  
INVENTOR(S)      : Wakeland It is certified that error appears in the above-identified patent and that said Letters Patent is hereby corrected as shown below:

In column 1, line 60, delete "drawings," and insert -- drawings: --, therefor.

In column 4, line 66, delete "48K Hz" and insert -- 48 kHz --, therefor.

In column 16, line 2, in Claim 31, after "the" delete "a".

Signed and Sealed this

Twenty-fourth Day of February, 2009

JOHN DOLL  
*Acting Director of the United States Patent and Trademark Office*